United States Patent
Corarito

(10) Patent No.: US 6,944,568 B1
(45) Date of Patent: Sep. 13, 2005

(54) SYSTEM AND METHOD FOR PROVIDING SECURE TESTING AIDS

(76) Inventor: Douglas Corarito, 65 Dell Rd., Rowe, MA (US) 01376

( * ) Notice: Subject to any disclaimer, the term of this patent is extended or adjusted under 35 U.S.C. 154(b) by 68 days.

(21) Appl. No.: 10/707,270

(22) Filed: Dec. 2, 2003

(51) Int. Cl.7 .......................... G01M 19/00; G06F 19/00
(52) U.S. Cl. .................................................... 702/123
(58) Field of Search ............................... 702/122, 123, 702/127, 119; 717/168–173; 455/95–100

(56) References Cited

U.S. PATENT DOCUMENTS

| | | | |
|---|---|---|---|
| 3,979,057 A | | 9/1976 | Katz |
| 5,036,479 A | * | 7/1991 | Prednis et al. ............... 702/121 |
| 5,267,147 A | * | 11/1993 | Harshaw et al. .............. 705/32 |
| 5,313,396 A | * | 5/1994 | Terpstra et al. ............. 701/200 |

2002/0196029 A1 * 12/2002 Schmidt ..................... 324/500

* cited by examiner

Primary Examiner—Michael Nghiem
Assistant Examiner—Demetrius R. Pretlow
(74) Attorney, Agent, or Firm—Mark P. White

(57) ABSTRACT

A method for testing utilizing a handheld computer having software which includes a launcher and a multiplicity of previous applications includes the steps exchanging the contents of the internal flash-ROM memory for the contents of an external memory module which contains a testing application and a verification application. The verification application ensures that after the exchange the contents of the flash-ROM memory contains only programs which have been authorized by the testing agency to be present when the test is taken, and that all communications and networking capability of the handheld computer are disabled during testing. At the conclusion of testing the handheld computer is returned to its original configuration by a second exchange between the flash-ROM memory and the external memory module.

22 Claims, 5 Drawing Sheets

SYSTEM AND METHOD FOR PROVIDING SECURE TESTING AIDS

BACKGROUND OF INVENTION

In its best mode present invention is directed to the use of a handheld computer containing a flight calculator as an approved device for airman testing in accordance with Order 8080.6C of the FAA (Federal Aviation Administration).

This Order defines the devices which can be used as testing aids during the airman testing, and their characteristics. A number of hard-wired, prior-art calculators have been approved for use with airman testing, and it is desired to implement a program which would be acceptable to the FAA for use as a testing aid when resident on a handheld computer.

Because of the flexibility of a handheld computer, however, there is a danger that a program having approved characteristics, and resident on the computer may be excluded from approval, because the handheld computer possesses other capabilities which can be used to circumvent testing security. For instance, a handheld computer may be used by an unscrupulous testee to illicitly store test answers in violation of the FAA rules.

The present invention provides a method to allow the use of a handheld computer for testing purposes under the FAA rules by including a verification of the handheld computer contents at the time of testing. This verification insures that:

(1) the ability of the handheld computer to communicate or network is disabled;

(2) the handheld computer contains only those programs previously approved for testing; and (3) the handheld computer's RAM, ROM and external memory are placed in a known, approved state.

After verification has been passed, the present invention provides for restoring the handheld computer to its original condition for general use.

Although the present invention was inspired by the requirements of FAA airman testing, it clearly has uses in other applications beyond the FAA testing requirements.

SUMMARY OF INVENTION

It is an object of the present invention to provide a method for testing, using a handheld computer, wherein the pre-existing programs of the handheld computer are exchanged for a new set of programs configured specifically for said testing. It is a further object of this invention to provide such a method which contains a verification procedure which assures a proctor supervising the test that the program contents of the handheld computer contain only programs approved for use in the test.

In accordance with a first aspect of the invention, the method for testing utilizes a handheld computer including an application launcher and a multiplicity of previous applications.

In accordance with a second aspect of the invention the method includes removing those applications that are unrelated to airman testing, loading one or more new applications into the handheld computer, loading a verification application into the handheld computer, launching, by the proctor, of the verification application and verifying whether or not the handheld computer contains only an approved set of applications and the launcher, allowing the testee to proceed with the test if and only if it does contain only the approved set of applications and launcher.

In accordance with a third aspect of the invention, after proceeding to take the test, the testee erases the applications used for testing from the handheld computer and restores the previous applications to the handheld computer.

In accordance with a fourth aspect of the invention, the method launcher and a multiplicity of previous applications are all originally stored in an internal memory in the form of an old image, and an external memory containing a new image is connected to the handheld computer, the new image containing a verification application and one or more new applications, and the new image on the external memory is exchanged with the old image on the internal memory.

In accordance with a fifth aspect of the invention, the testee exchanges the old image on the external memory with the new image on the internal memory after testing, thereby restoring the handheld computer to its original configuration.

In accordance with a sixth aspect of the invention the verifying further includes the steps of performing a checksum calculation on one or more portions of the internal memory, and comparing the resulting checksum to a desired checksum.

In accordance with a seventh aspect of the invention the verifying further comprises comparing a desired key code with a key code generated by the verifying step.

In accordance with an eighth aspect of the invention the verifying includes confirming that no network devices of the handheld computer are enabled, and that no communications devices of the handheld computer are enabled.

In accordance with a ninth aspect of the invention the value of the generated key code is a dynamic value.

In accordance with a tenth aspect of the invention the dynamic value is generated by a pseudo-random number generator, comprising a PRNG algorithm, in the handheld computer, and is compared to a value generated by the same pseudo-random number generator, comprising the PRNG algorithm, outside of the handheld computer.

In accordance with an eleventh aspect of the invention the internal memory of the handheld computer holding the applications is a flash ROM memory or any other semi-permanent memory type.

In accordance with a twelfth aspect of the invention the external memory of the handheld computer can be a removable memory module.

In accordance with a thirteenth aspect of the invention the verification code is different for each of a number of different test centers.

In accordance with a fourteenth aspect of the invention the verifying is performed by a verification application which incorporates encryption to some or all of the verification application.

In accordance with a fifteenth aspect of the invention the new applications include a flight calculator.

BRIEF DESCRIPTION OF DRAWINGS

These, and further features of the invention, may be better understood with reference to the accompanying specification and drawings depicting the preferred embodiment, in which.

DETAILED DESCRIPTION

Figure 1:
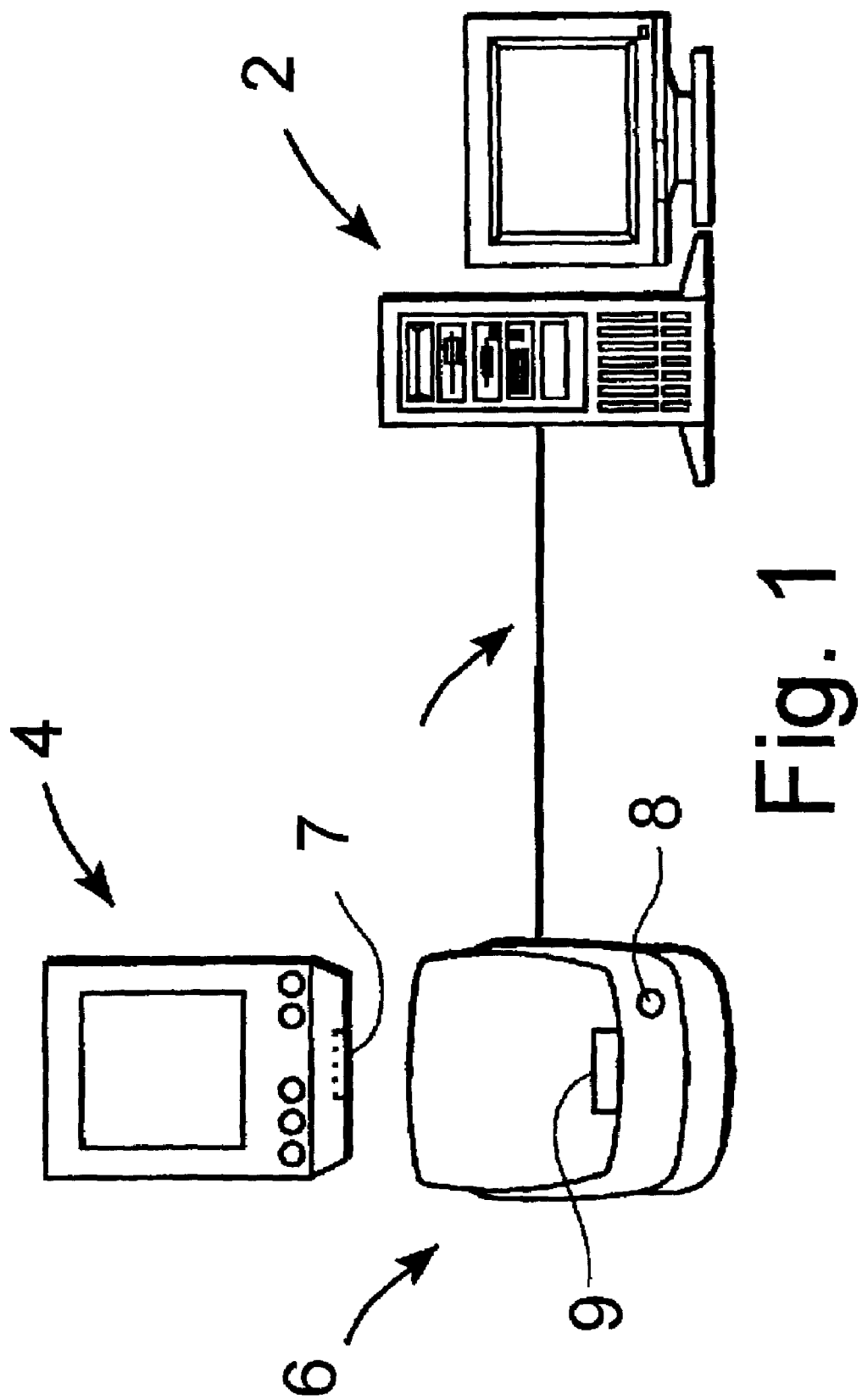
FIG. 1 depicts the hardware configuration required for the download embodiment of the invention.

The present invention in its best mode is a method for using a prior-art handheld computer as a host for flight computer software which can be used in conjunction with FAA certified testing. In more general embodiments, the method may be used in conjunction with any prior-art computer running a testing aid application which can be used in conjunction with any certified testing process.

In the subsequent description the term handheld computer will be used interchangeably with the term palm-top, and used to mean any general purpose hand held computer or device having computational capabilities.

The invention further provides a secure program, contained within the palm-top, which verifies to a test proctor that the palm-top does not contain any means for the user to view previously stored test answers in violation of the FAA rules. And finally the invention provides for a means to store pre-existing palm-top applications on a remote computer, to erase those pre-existing applications from the palm-top, to download the flight calculator program from the remote computer, and to restore the pre-existing program to the palm-top after the testing.

The invention further provides a secure program environment contained in the handheld computer which verifies to a test proctor that the handheld computer does not permit the user to access any previously stored data or store any data during the exam. And finally the invention provides for a means to install the secure program environment and then restore the handheld computer to its original state after testing.

The handheld computer typically contains a number of software components stored in an internal memory of the handheld computer which is typically erasable. A popular common implementation provides an erasable flash memory, called herein the internal flash ROM, which contains these software components, and maintains them even when power to the handheld computer is removed. The handheld computer is usually protected against inadvertent erasure of the internal flash ROM by making such erasure very difficult for a non-sophisticated user. However, this internal flash ROM can be erased, and reloaded with other software which may execute properly on the handheld computer, providing that such software is properly designed. The current invention provides for the erasing of the software resident on the internal flash ROM and its replacement by other software which contains the functions required for this invention.

An alternative to the erasing of the internal flash ROM and subsequent reloading of new data into the internal flash ROM can be accomplished in one step by simply overwriting the image contained on the internal flash ROM with a complete new internal flash ROM image.

In addition to the internal flash ROM which contains the handheld computer software, the typical handheld computer also contains RAM which can be read or written by the handheld computer software, but which is volatile, so that it is erased when the handheld computer is switched off.

Figure 2:
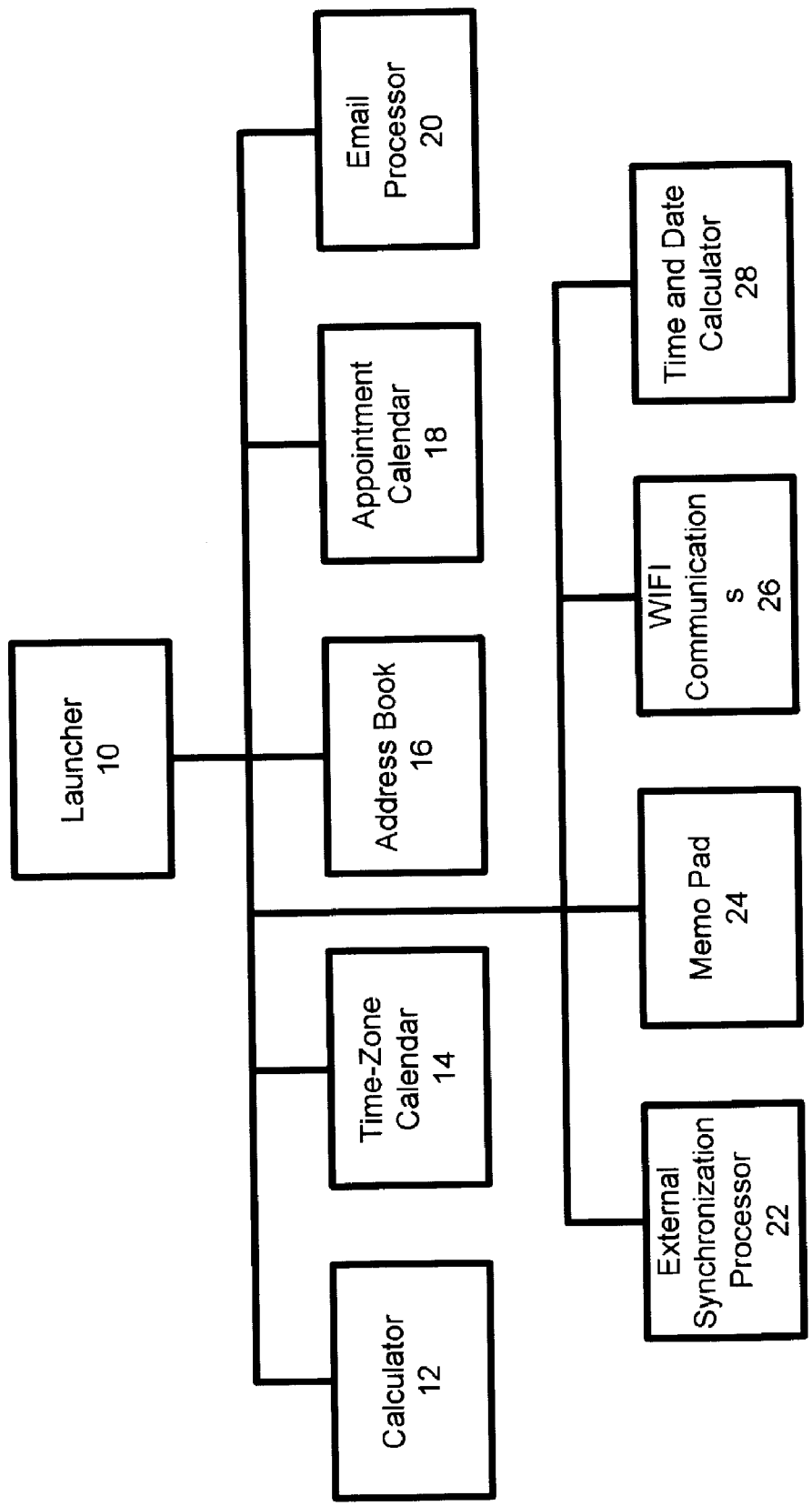
FIG. 2 depicts the configuration of the typical software contents of a typical handheld computer.

FIG. 2 shows the software components of a typical handheld computer. The launcher 10 is a type of operating system which controls input from the user through the handheld computer's keyboard, touch-screen, infra-red, memory, and input port devices. In addition, the launcher also provides means to load one of the applications programs into a section of RAM memory, and to begin execution of the loaded application. When an application is loaded, previously loaded applications are usually overwritten.

An alternative form of launcher executes the program applications directly from their locations in the internal flash ROM.

All of the software contained within the handheld computer, whether part of the operating system (launcher) or application software, is stored in the internal flash ROM of the handheld computer. In addition, most handheld computer's have the ability to incorporate other applications via additional plug-in memory modules such as secure digital, or SD cards, which can be incorporated without disassembling the handheld computer.

A typical set of applications are shown in FIG. 2. These include a simple calculator 12, time and date calculator 14, time-zone calculator 14, address book 16, appointment calender 18, Email processor 20, external synchronization processor 22, Memo Pad 24, and WIFI communications Module 28.

Several of these applications have the ability to input and store data, and to display the data subsequently. The memo pad, for instance, contains a primitive word processor, and the email processor allows the user to input data to be emailed out, and to display data which has been emailed in, presumably over a wireless or WiFI® connection. The data from these applications is generally stored in the internal flash ROM, so that it is not lost when the handheld computer is powered down.

In addition most handheld computers provide for the downloading and subsequent execution of additional applications not originally installed on the handheld computer. In the instant case, one or more applications are provided in the handheld computer to be used by pilots to perform flight planning, navigation and other performance computations necessary for safe flight. The handheld computer and the applications will be referred to hereinafter collectively as the flight calculator. The flight calculator is designed to be used as an approved device for air-man testing in accordance with Order 8080.6C of the Federal Aviation Administration, entitled "Conduct of Airman Knowledge Tests". This order provides, inter alia, that "Testing centers may provide calculators to applicants and/or deny applicants' use of their personal calculators based on the following limitations: (1) Prior to, and upon completion of the test, while in the presence of the proctor, the applicant must actuate the ON/OFF switch and perform any other function that ensures erasure of any data stored in memory circuits.

(2) The use of electronic calculators incorporating permanent or continuous type memory circuits without erasure capability is prohibited. The proctor may refuse the use of the applicant's calculator when unable to determine the calculator's erasure capability." The purpose of these regulations is to prevent the test-taker from using a device which could contain the test answers in other portions of the calculators which have the ability to input and store text, and thus circumvent the purpose of the test.

A handheld computer-based flight calculator would ordinarily not be able conform to these requirements, since, as indicated above, commonly-used handheld computers have the ability to input and store data, and further do not possess the ability to clear the data stored in selected applications with the stroke of a single button.

The current invention, however, provides a means adapting a handheld computer to the requirements of Order 8080.6.

Download Embodiment

The embodiment of the invention may be understood by first referring to FIG. 1, which depicts a personal computer 2 attached to a palm-top handheld computer (personal digital assistant) 4 by means of a cradle 6, which is, in turn, connected to the personal computer via a USB cable 8. The cradle allows a simplified physical interface for the handheld computer, and typically contains a switch 8 which commands the synchronization of data between the personal computer and the handheld computer. The handheld computer is electrically connected to the cradle via a comb of external contacts 7 located on the bottom end of the handheld computer, which mates with a connector 9 mounted on the cradle.

Figure 3:
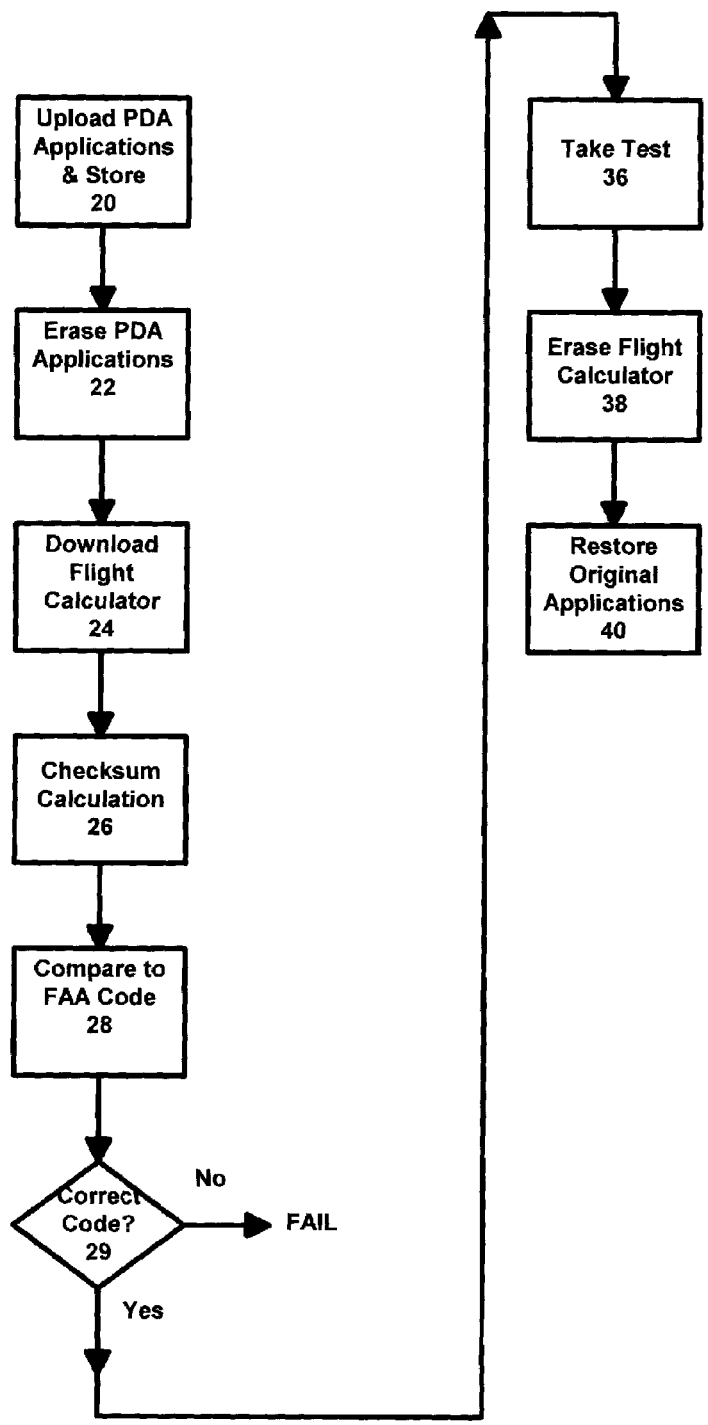
FIG. 3 depicts a flow chart of the download embodiment of the invention.

The method may be understood in one of its embodiments by referring to the flow chart of FIG. 3.

This figure assumes that the PC Host software which controls the process has first been loaded into the computer 2, and is running.

The first step, as seen in FIG. 3, is to upload 20 the handheld computer applications from the handheld computer and store them in the computer, where they can later restored to the handheld computer. Next, the handheld computer applications 22 are erased from the handheld computer, and the RAM is likewise cleared. This erasure may be total, or partial, wherein only those applications with the capability of storing and displaying text information are erased. Further, the erasure may be commanded by the computer, or, alternatively, a small application may be downloaded into the handheld computer which, in turn may be activated to erase the applications. Note further that this erasure may be done in advance of the testing, or may be commanded at the test center at the time of the test.

The flight calculator is next downloaded 24 into the handheld computer, together with a verification program. The verification program may be included as part of the flight calculator, or it may be a separate program module, which has the advantage that the flight calculator, when loaded for use other than testing, takes up less memory in the handheld computer when the verification program is not included. At this point, the handheld computer is in condition to be used for FAA airman testing.

The next steps provide verification at the test site that the handheld computer is in condition for testing. This verification has the purpose of insuring that the flight calculator is the program approved by the FAA, and further that the handheld computer does not contain any programs capable of storing and displaying the test answers, many of which are available in advance to the persons being tested (the "testees").

The proctor starts the verification process 26 by executing a checksum calculation of the internal flash ROM image of the handheld computer. The checksum also includes the handheld computer RAM, which is cleared at the time that the internal flash ROM image was erased, or swapped for a new image.

If the checksum test produces the correct checksum, which is stored within the verification program, then the verification program produces a verification or key code, which the proctor checks against the code supplied to him by the FAA (the FAA code). If the checksum test is passed, and the key code is correct, then the proctor allows the testee to take the test 36. Otherwise, the handheld computer is judged to be illegal for testing purposes, and the testee may proceed to take the test, but without use of the handheld computer-based flight calculator.

At the end of the test the proctor again is given the handheld computer containing the flight calculator, and executes an erasure of the RAM memory 38 before allowing the testee to depart the test center.

Finally, after the last step has been completed, the testee may restore the handheld computer to its pre-test configuration by again connecting the erasing the applications of the internal flash ROM and downloading an image of the original internal flash ROM onto the internal flash ROM 40.

Removable Memory Module Image Embodiment

As an alternative to downloading the flight calculator and verification applications from a computer onto the handheld computer internal flash ROM which contains all of the applications which reside on the handheld computer, in addition to the launcher.

In this embodiment the flight calculator and verification program are not downloaded by the testee by the link shown in FIG. 1, but are contained on an external removable memory module inserted into the handheld computer in an externally accessible port designed to allow additional applications to be added to the handheld computer without having to download them into the internal flash ROM internal to the handheld computer.

The use of such removable memory modules is well known in the prior art and need not be described here in further detail.

In this embodiment the external memory module contains an application which permits a swapping of the image of the internal flash ROM with the flight calculator-verification image contained on the external memory module.

Figure 5:
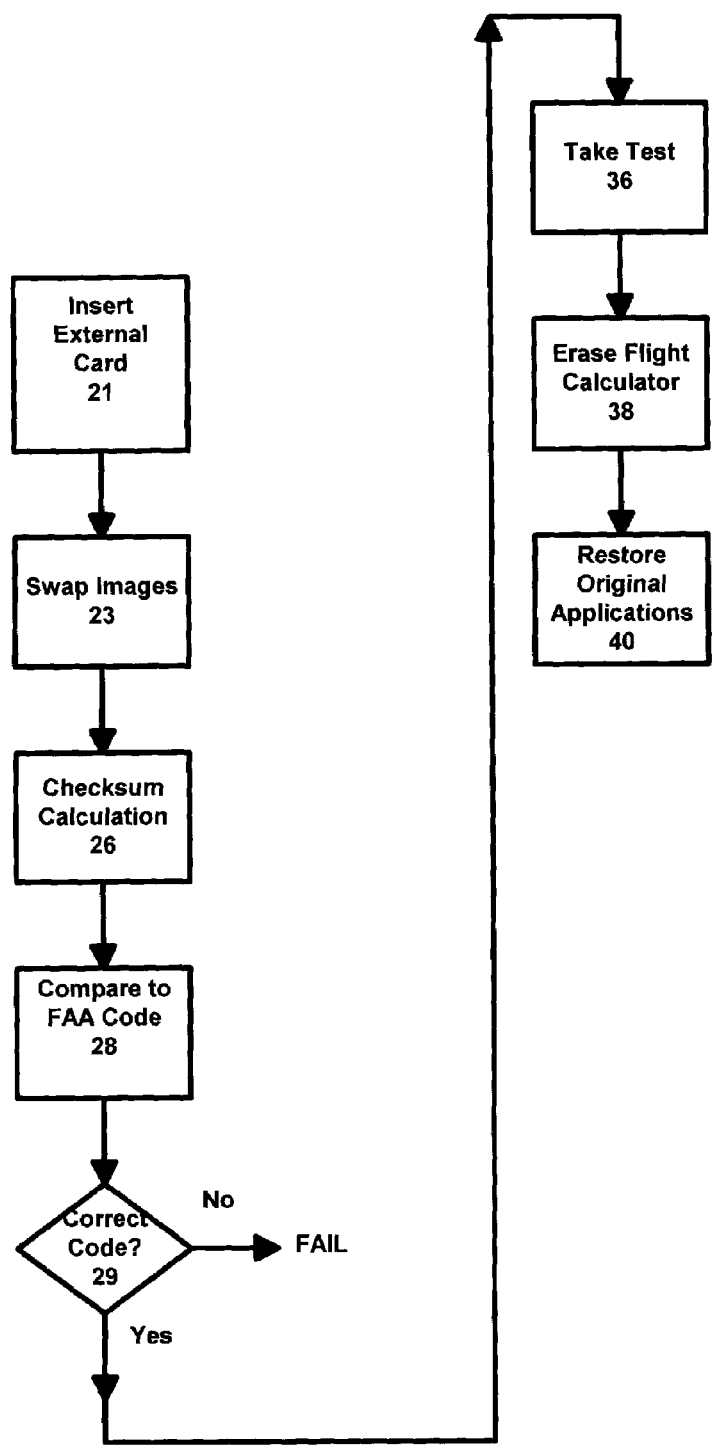
FIG. 5 depicts a flow chart of the complete operation of the embodiment using a handheld computer having a flash-ROM internal memory and an external memory module.

The operation of this embodiment may be understood by referring now to FIG. 5. The flow chart of this Figure begins when the testee, prior to arriving at the test site, first inserts the Configuration external memory module into the external port of the handheld computer 21. This Configuration card contains an application which performs the swapping 42 the image of the internal flash ROM with the flight calculator-Verification image contained on the Configuration removable memory module.

Next, the Configuration application is executed 23, which actually performs the swapping of the two images.

Once the swapping is performed, the method proceeds as in the previous embodiment, in which the reference number of the steps and the descriptions within the flow chart elements are the same as in said previous embodiment, beginning with the Checksum Calculation Module (reference number 26).

In order to perform the verification that the key code corresponds to the FAA code, a number of options are available, which provide an increasing level of security, and are described as follows.

Primary Verification Embodiment

After the software of the present invention has been swapped with the software previously residing on the handheld computer, the verification procedure may begin.

Figure 4:
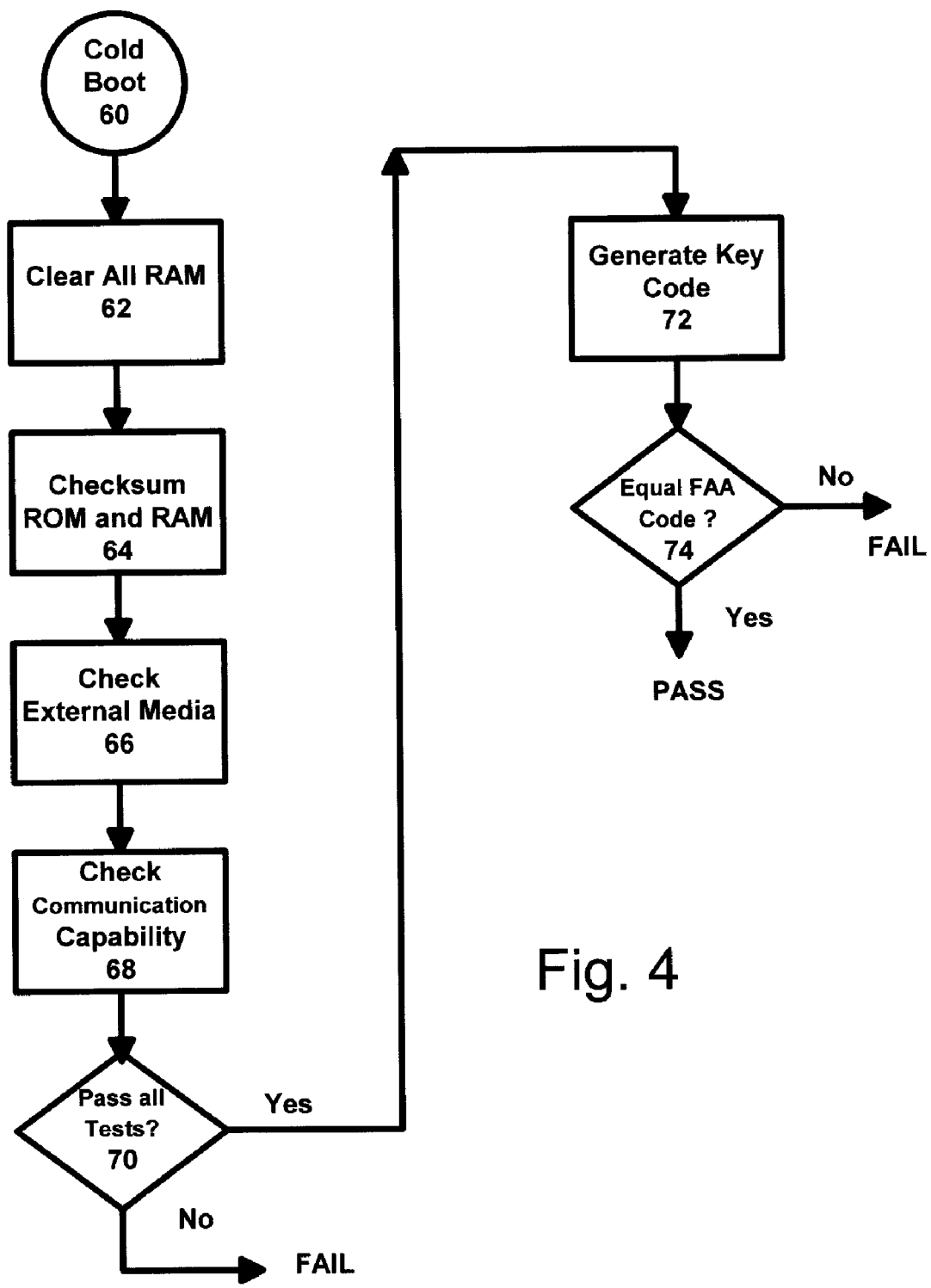
FIG. 4 depicts a flow chart of the verification execution of the embodiment using a handheld computer having a flash-ROM internal memory and an external memory module.

The software of the handheld computer is launched when the handheld computer is powered up. Upon launch, the software of the present invention will perform the functions shown in the flow chart of FIG. 4.

A system cold boot or hard reset 60 is first performed. This cold boot will clear all volatile memory (RAM) on the handheld computer device 62.

Next, a checksum of both the internal flash ROM and all RAM is performed 64 in order to verify that the ROM and RAM are in a known, approved state before proceeding, and the checksum calculated is compared to a value stored in the flash-ROM memory.

The system next checks that no external memory media, such as external SD cards, are currently inserted 66.

Finally, the system checks to make sure that any network devices and external communication devices are disabled 68. The software of the present invention, which is now the only software resident on the handheld computer, does not have any capability to enable any of the communication or networking facilities of the handheld computer.

The verification program next tests to determine if any of these tests fails 70, and if so the program will not continue, but indicate a failure. Otherwise, the verification program generates a code, and prompts the test administrator, or proctor for acceptance. The proctor checks this code against a code obtained from the FAA 74. If the codes correspond, then the proctor will allow the testee to proceed with the test, but otherwise the testee will not be allowed to use the flight calculator to used for the test.

In an alternative version of this embodiment code generated by the handheld computer, and that supplied by the FAA will be a dynamic value which changes in accordance with a formula dependent upon one or more variables supplied to the handheld computer verification program. For instance, a pseudo-random number generator may be used which uses a variable input supplied by the FAA, together with the FAA code, prior to verification. The verification of step 74 requires the proctor to input the variable, after which the code is generated using the same pseudo-random number generator algorithm as that used by the FAA in generating the FAA code.

First Verification Input Embodiment

In this embodiment, the proctor supervising the testing starts the verification application which appears on the screen of the handheld computer. The verification application begins, and requests a verification key, which is a code, or password, known only to the proctors. In this embodiment, a single verification key is used which is effective for all testing centers. When the proctor keys in the proper verification key, the verification application begins a verification check of all of the applications still residing on the handheld computer. Typically this verification check is a type of checksum check of all of these remaining applications. If the checksum check produces a result which equals a value stored in the verification program, then the application produces a message on the handheld computer stating that the verification has succeeded. Otherwise, the handheld computer produces a "FAILURE" message. Other output message embodiments are discussed infra.

The alternative to this procedure is to perform the checksum calculations first, and if the checksum is correct, to check the verification key before allowing the testing to proceed.

The use of this verification key insures that a testee may not run the verification application, but that only a proctor may do so. Preventing the testee from running the verification application makes it difficult for the testee to understand the operation of the verification application, and thus circumvent the verification features.

Second Verification Input Embodiment

In a further embodiment, there is a verification key corresponding to each testing center, and the proctor at each such center is apprised of the corresponding verification key. In addition to the verification key for a specific testing center, the name of the center, or its zip code, or other commonly used location code is also keyed in to the verification program. Thus, the proctor must not only have the verification key, but the verification key which corresponds to his or her particular testing center, in order to allow the checksum testing to proceed, and eventually produce a "SUCCESS" message on the handheld computer. Thus a table of all of the verification keys must be contained within the verification program.

Third Verification Input Embodiment

In a still further embodiment a pseudo-random code generator (PRCG) is utilized to generate a verification key in real time, so that the verification code for each test site need not be input in advance to the verification program. The use of a verification key which is not a fixed, preset value in the handheld computer is referred to as a dynamic key.

This embodiment requires the use of a program running on a local computer at the testing center, or somewhere within the testing organization, which produces the verification key and makes the verification key accessible to the proctor. The PRCG will generate a verification key based on a local variable not predictable in advance of the test. For instance, the current local time may be used, in the form hh:mm:ss, where hh represents hours, mm represents minutes, and ss represents seconds. In this embodiment the local computer uses its local time as input to the PRCG, and generates a pseudo-random code (PRC). The local computer then displays both the local time used as input, and the resulting PRC, which is used as the verification key.

In this embodiment the proctor may operate the local computer generating the PRC, or, alternatively, the generation of the PRC may be done at a higher level of the tester organization. In either case, the proctor will have access to both the PRC (the verification key) and the local variable used to generate the key. The proctor may then start the verification application residing on the handheld computer. The verification application requests the local time used by the local-computer PRCG, and then generates the verification key. Since the verification application in the handheld computer contains the same algorithm used by the local-computer PRCG, the handheld computer verification program should produce a verification key equal to that produced by the local computer PRGC.

Thus, the verification key generated by the handheld computer must be the same as that provided by the tester organization for the proctor to allow the testee to proceed using the flight calculator of the present invention.

Fourth Verification Input Embodiment

The verification of the contents of the handheld computer in the previous embodiments was accomplished in two steps: first, by authenticating the verifier, presumably the proctor, by the entering of a verification key, and second, having authenticated the verifier, next calculating the checksum of all the applications stored on the handheld computer, together with the contents of the other memories of the handheld computer, including the RAM, and comparing to the checksum previously stored in the verification program.

As a further security measure, this embodiment utilizes a PRNG which takes as inputs the verifier's verification key and the checksum, and generates a PRN which is then compared to a result previously stored in the verification program. Thus, in this embodiment, an unscrupulous testee seeking to circumvent the handheld computer's security would have to know the checksum value, the verification key to be input by the proctor, and the algorithm used by the PRNG in order to circumvent the verification security system.

Verification Test Result Outputs

In its simplest form verification produces a code, such as an alpha-numeric or numeric result, displayed on the handheld computer screen. The proctor has been provided with a code in advance, and if the handheld computer output result does not correspond to this code, the testee will not be allowed to proceed using the flight calculator.

Alternatively, the proctor may input the expected code prior to running verification application. The verification results can then be displayed by a simple text output, with the message "SUCCESS" or "FAILURE". However, a testee wishing to circumvent the verification test could conceivable substitute for the verification application an application which accepted the same inputs as the true verification program, but always produced the word "SUCCESS", thus allowing the testee to circumvent the verification, even if illegal data were stored on the handheld computer, in addition to the flight calculator.

Encryption Embodiment

In order to prevent an unscrupulous testee from disassembling the verification program, the program, in part or in whole, may be encrypted. In the second embodiment, for instance, the table of verification keys alone could be encrypted, since verification keys corresponding to the various test centers might be easily recognized.

While the invention has been described with reference to specific embodiments, it will be apparent that improvements and modifications may be made within the purview of the invention without departing from the scope of the invention defined in the appended claims.

What is claimed is:

1. A method for testing, utilizing a handheld computer comprising a launcher and a multiplicity of previous applications, the method comprising the steps of:
   (a) erasing all of the previous applications in the handheld computer;
   (b) loading one or more new applications into the handheld computer;
   (c) loading a verification application into the handheld computer;
   (d) launching by a proctor of the verification application and verifying whether or not the handheld computer contains only the new applications and the launcher, and proceeding only if it does;
   (e) performing the testing with the aid of the new applications;
   (f) erasing the new applications from the handheld computer;
   (g) restoring the previous applications to the handheld computer.

2. The method of claim 1, wherein the verifying further comprises the steps of performing a checksum calculation on one or more portions of the internal memory, and comparing the resulting checksum to a desired checksum.

3. The method of claim 2, wherein the verifying further comprises comparing a desired key code with a key code generated by the verifying step.

4. The method of claim 3, wherein the verifying further comprises confirming that now network devices of the handheld computer are enabled, and that no communications devices of the handheld computer are enabled.

5. The method of claim 3, wherein the value of the generated key code is a dynamic value.

6. The method of claim 5, wherein the dynamic value is generated by a pseudo-random number generator, comprising a PRNG algorithm, in the handheld computer, and is compared to a value generated by pseudo-random number generator, comprising the PRNG algorithm, outside of the handheld computer.

7. The method of claim 3, wherein the internal memory further comprises a flash ROM memory.

8. The method of claim 7, wherein the external memory further comprises a removable memory module.

9. The method of claim 3, wherein the verification code is different for each of a multiplicity of test centers.

10. The method of claim 3, wherein the verifying is performed by a verification application comprising encryption to some or all of the verification application.

11. The method of claim 3, wherein the new applications further comprises a flight calculator.

12. A method for testing utilizing a handheld computer comprising a launcher and a multiplicity of previous applications, all stored in an internal memory in the form of an old image, and further comprising an external memory which further comprises a new image, the new image further comprising a verification application and one or more new applications, the method comprising the steps of:
   (a) exchanging the new image on the external memory with the old image on the internal memory;
   (b) launching by a proctor of the verification application and verifying whether or not the handheld computer contains only the new applications and the launcher, and proceeding only if it does;
   (c) performing the testing with the aid of the new applications; and
   (d) exchanging the old image on the external memory with the new image on the internal memory.

13. The method of claim 12, wherein the verifying further comprises the steps of performing a checksum calculation on one or more portions of the internal memory, and comparing the resulting checksum to a desired checksum.

14. The method of claim 13, wherein the verifying further comprises comparing a desired key code with a key code generated by the verifying step.

15. The method of claim 14, wherein the verifying further comprises confirming that now network devices of the handheld computer are enabled, and that no communications devices of the handheld computer are enabled.

16. The method of claim 14, wherein the value of the generated key code is a dynamic value.

17. The method of claim 16, wherein the dynamic value is generated by a pseudo-random number generator, comprising a PRNG algorithm, in the handheld computer, and is compared to a value generated by pseudo-random number generator, comprising the PRNG algorithm, outside of the handheld computer.

18. The method of claim 14, wherein the internal memory further comprises a flash ROM memory.

19. The method of claim 18, wherein the external memory further comprises a removable memory module.

20. The method of claim 14, wherein the verification code is different for each of a multiplicity of test centers.

21. The method of claim 14, wherein the verifying is performed by a verification application comprising encryption to some or all of the verification application.

22. The method of claim 14, wherein the new applications further comprises a flight calculator.

* * * * *